United States Patent
Sinha et al.

(10) Patent No.: US 10,218,018 B2
(45) Date of Patent: Feb. 26, 2019

(54) FUEL CELL STACK HEALTH MONITORING USING GROUPS OF FUEL CELLS

(71) Applicants: GM GLOBAL TECHNOLOGY OPERATIONS LLC, Detroit, MI (US); Honda Motor Co., Ltd., Minato-ku, Tokyo (JP)

(72) Inventors: Manish Sinha, Rochester Hills, MI (US); Pinkhas A. Rapaport, Penfield, NY (US); Hiromichi Yoshida, Utsunomiya (JP); Shohei Toyota, Utsunomiya (JP); Yeh-Hung Lai, Oakland, MI (US)

(73) Assignees: GM Global Technology Operations LLC, Detroit, MI (US); Honda Motor Co., Ltd., Tokyo (JP)

( * ) Notice: Subject to any disclaimer, the term of this patent is extended or adjusted under 35 U.S.C. 154(b) by 291 days.

(21) Appl. No.: 15/144,936

(22) Filed: May 3, 2016

(65) Prior Publication Data
US 2017/0324106 A1 Nov. 9, 2017

(51) Int. Cl.
*H01M 8/04992* (2016.01)
*H01M 8/04537* (2016.01)
*H01M 8/04746* (2016.01)
*H01M 8/04291* (2016.01)
*H01M 8/04858* (2016.01)

(52) U.S. Cl.
CPC ... *H01M 8/04992* (2013.01); *H01M 8/04291* (2013.01); *H01M 8/04559* (2013.01); *H01M 8/04649* (2013.01); *H01M 8/04753* (2013.01); *H01M 8/04952* (2016.02); *H01M 2250/20* (2013.01); *Y02T 90/32* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,855,898 B2* | 10/2014 | Maier | ............ | B60K 15/03006 701/115 |
| 9,383,398 B2* | 7/2016 | Choi | ............. | G01R 31/00 |
| 2007/0259256 A1* | 11/2007 | Le Canut | ......... | H01M 8/04089 429/90 |
| 2015/0362560 A1* | 12/2015 | Jeong | ............. | H01M 8/04992 429/431 |
| 2016/0006059 A1* | 1/2016 | Kwon | ............ | B60L 11/1892 429/434 |
| 2016/0020474 A1* | 1/2016 | Ko | ................ | H01M 8/04992 429/446 |
| 2016/0164124 A1* | 6/2016 | Suh | .............. | H01M 8/04604 429/411 |
| 2017/0025692 A1* | 1/2017 | Zhang | ............ | H01M 8/04447 |

* cited by examiner

*Primary Examiner* — Kaity V Chandler
(74) *Attorney, Agent, or Firm* — Quinn IP Law

(57) ABSTRACT

A fuel cell stack includes a plurality of cell groups and a controller wherein each cell group comprises a plurality of fuel cells and a group sensor which measures one or more electrical characteristics of the respective cell group. The controller comprises one or more processors and memory and is communicatively coupled to each group sensor. The one or more processors execute machine readable instructions to compare a measured electrical characteristic of each cell group to one or more thresholds stored in memory, and indicate the need for diagnostics of the fuel cell stack when the comparison indicates a non-systemic event.

20 Claims, 10 Drawing Sheets

FUEL CELL STACK HEALTH MONITORING USING GROUPS OF FUEL CELLS

TECHNICAL FIELD

The present specification generally relates to methods and apparatuses for monitoring and identifying non-systemic events in a fuel cell stack and, more specifically, methods and apparatuses for grouping fuel cells within the fuel cell stack to monitor and identify non-systemic events experienced by individual fuel cells within each group.

BACKGROUND

Fuel cells convert a fuel into usable electricity via chemical reaction. A significant benefit to such an energy-producing means is that it is achieved without reliance upon combustion as an intermediate step. As such, fuel cells have several environmental advantages over internal combustion engines (ICEs) and related power-generating sources for propulsion and related motive applications. In a typical fuel cell—such as a proton exchange membrane or polymer electrolyte membrane (in either event, PEM) fuel cell—a pair of catalyzed electrodes are separated by an ion-transmissive electrolyte layer (such as Nafion™) such that together these three layers form what is commonly referred to as a membrane electrode assembly (MEA). A typical catalyst loading on the anode and cathode is about 0.05 to 0.4 mg of platinum (Pt) per square centimeter of support surface area (such as a porous carbon-based mat). The electrochemical reaction occurs when a first reactant in the form of a gaseous reducing agent (such as hydrogen, $H_2$) is introduced to and ionized at the anode and then made to pass through the ion-transmissive medium such that it combines with a second reactant in the form of a gaseous oxidizing agent (such as oxygen, $O_2$) that has been introduced through the other electrode (the cathode); this combination of reactants form water as a byproduct. The electrons that were liberated in the ionization of the first reactant proceed in the form of direct current (DC) to the cathode via external circuit that typically includes a load (such as an electric motor, as well as various pumps, valves, compressors or other fluid delivery components) where useful work may be performed. The power generation produced by this flow of DC electricity can be increased by combining numerous such cells into a larger power-producing assembly. In one such construction, the fuel cells are connected along a common stacking dimension—much like a deck of cards—to form a fuel cell stack. It will be appreciated by those skilled in the art that within the present context, any such arrangement of numerous individual cells arranged to increase the overall electrical voltage or current output are deemed to define a stack, even in situations where such precise stacked arrangement of the cells is not readily apparent.

Due to factors such as flooding or ice blockage in the diffusion media (DM) or flow channels, as well as $H_2$ maldistribution within or across the MEA, some of the cells within a fuel cell stack may experience a reduced supply of $H_2$ to the anode; this may occur during either startup or normal operation, and in extreme examples, the supply may be cut off altogether. A global $H_2$ starvation in the anode (where the $H_2$ supply is completely cut off) leads to a phenomenon known as cell reversal where the anode is polarized to a potential much higher than the cathode. When a small portion of the anode is cut off from the $H_2$ supply, the portion of the cathode corresponding to the portion of the anode starved of $H_2$ experiences voltage potentials that are higher than the oxidation threshold of certain key fuel cell components, such as the carbon that makes up the catalyst support layer. This in turn leads to carbon corrosion and a related performance loss or even electrical shorting in the effected cell.

Efforts to meliorate the effects of anode starvation and subsequent cell reversal have not been satisfactory. In one such effort, cell voltage monitoring (CVM) is used as a way to monitor the cell voltage change. Unfortunately, this monitoring only provides indicia of a hydrogen shortage event that has already developed within the stack. Moreover, placing CVM on every cell in the stack is costly because of the number of sensors, associated wires, and controller connections required to monitor and identify a non-systemic event in each cell. Another such effort may involve a catalyst that promotes preferential oxygen evolution reactions as a way to suppress competing carbon corrosion reactions; graphitized support strategies alone do not sufficiently reduce carbon corrosion rates under either global or localized $H_2$ starvation issues that frequently accompany fuel cell system startup, shutdown, transient or flow blockage operational conditions.

Accordingly, a need exists for alternative methods and systems for monitoring and identifying non-systemic events within a fuel cell stack.

SUMMARY

In one embodiment, a fuel cell stack includes a plurality of cell groups and a controller wherein each cell group comprises a plurality of fuel cells and a group sensor which measures one or more electrical characteristics of the respective cell group. The controller comprises one or more processors and memory and is communicatively coupled to each group sensor. The one or more processors execute machine readable instructions to compare a measured electrical characteristic of each cell group to one or more thresholds stored in memory, and indicate the need for diagnostics of the fuel cell stack when the comparison indicates a non-systemic event.

In another embodiment, a fuel cell propulsion system includes a controller, a fuel cell stack, one or more valves, and one or more fuel storage vessels. The one or more valves fluidly couple the one or more fuel storage vessels to the fuel cell stack and each fuel storage vessel stores either a reactant or air. The fuel cell stack comprises a plurality of cell groups wherein each cell group comprises a plurality of fuel cells and a group sensor. The group sensor measures one or more electrical characteristics of the respective cell group. The controller comprises one or more processors and memory and is communicatively coupled to each group sensor. The one or more processors execute machine readable instructions to compare a measured electrical characteristic to one or more thresholds stored in memory, and actuate the one or more valves to adjust the flow of reactant or air from the fuel storage vessels to the fuel cell stack when the comparison indicates a non-systemic event.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and not intended to limit the subject matter defined by the claims. The following detailed description of the illustrative embodiments can be understood when read in conjunction with the following drawings, where like structure is indicated with like reference numerals and in which:

DETAILED DESCRIPTION

Non-systemic failures of a fuel cell stack may impact the performance or cause a short circuit in only a few fuel cells within the fuel cell stack. These non-systemic failures, faults, or events may not be detectable by whole fuel cell stack health monitoring systems because the electrical characteristics of the affected fuel cells may not change in magnitude great enough to be identifiable or measurable by whole fuel cell stack health monitory systems. For example, a fuel cell experiencing a non-systemic event such as fuel cell reversal due to blocked ductwork in an individual fuel cell due to debris in the duct work may result in a short within the fuel cell. The non-systemic event needs to be detected and remediated during operation of the fuel cell stack to prevent further damage from occurring or the non-systemic fault from propagating into a systemic fault of the entire fuel cell stack. Monitoring the whole fuel cell stack with sensors which measure the electrical characteristics of the fuel cell stack may not identify a non-systemic event due to the small magnitude of the change within an individual fuel cell. Electrical noise and other factors may mask such small magnitude measurements. Further, individual monitoring of each individual fuel cell to identify these small magnitude measurements is cumbersome, complex to implement, expensive, and increases the chance of an error or failure of the health monitoring system. It is understood that non-systemic events are faults which affect the performance of one or more individual fuel cells but do not substantially affect the performance of the entire fuel cell stack. If non-systemic events are not remediated, they may result in a systemic failure of the entire fuel cell stack. It is also understood that fuel cell reversal is the condition of an individual fuel cell in which it consumes electricity instead of produces it. It is contemplated that this condition will manifest itself as a voltage drop in the output of the fuel cell or a change of impedance of the fuel cell.

Figure 1:
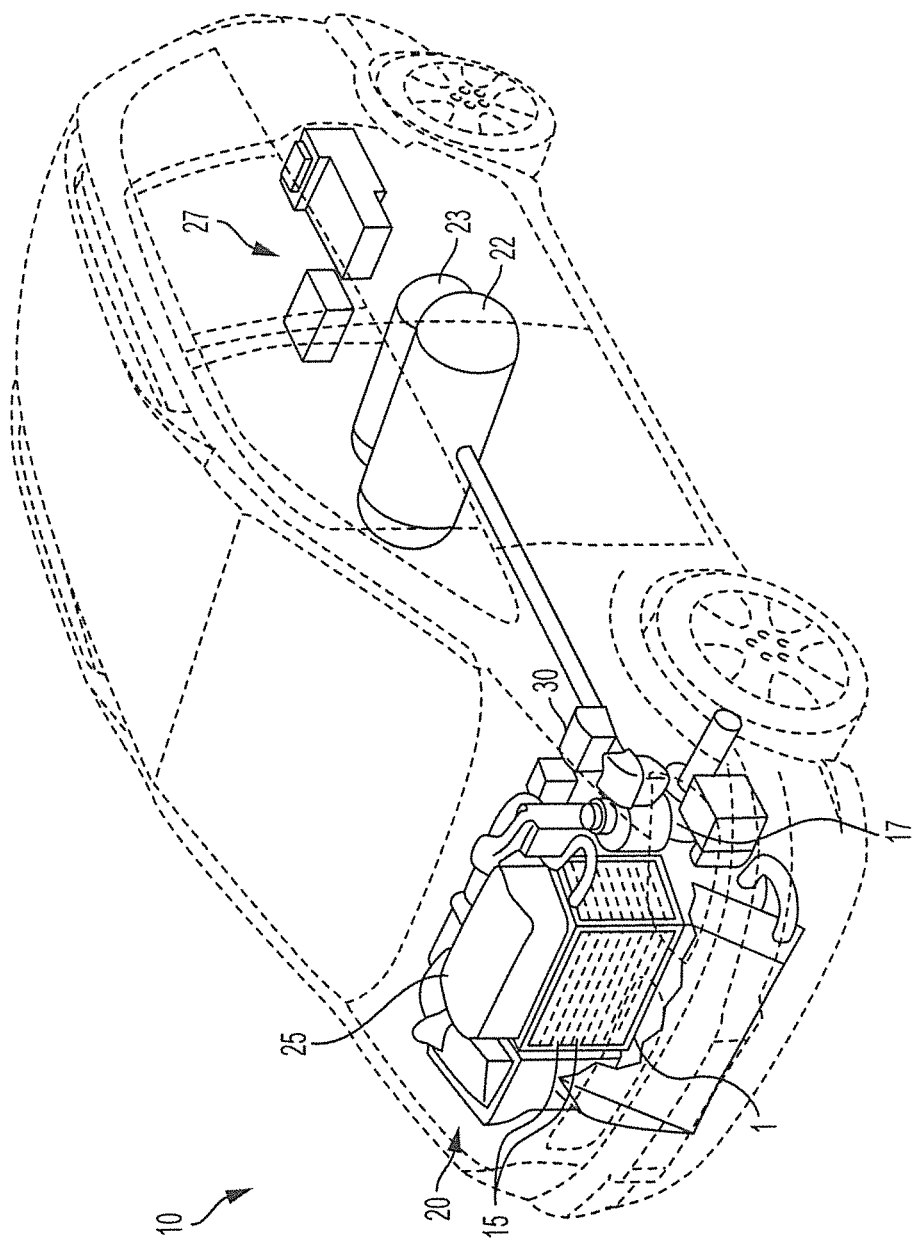
FIG. 1 depicts a vehicle with a fuel cell propulsion system according to one or more embodiments shown and described herein.

Referring first to FIG. 1, a vehicle 10 (for example, but not limited to, a car, a van, a bus, a truck, a motorcycle, a tank, a spacecraft, a ship, a boat, or a submarine) includes a fuel cell based propulsion system 20 comprising an electric motor 17 and a fuel cell stack 1. The electric motor 17 receives its electric power from the fuel cell stack 1 and/or one or more electrical storage devices 27 and provides motive force for the vehicle 10. The fuel cell stack 1 comprises numerous individual fuel cells 15. The fuel cell based propulsion system 20 may include one or more fuel storage vessels 22, 23, as well as power converters or related electronics 25, electrical storage devices 27 (e.g., batteries, ultra-capacitors or the like), one or more controllers 30 that provide operational management, and any number of valves, compressors, tubing, temperature regulators, and other ancillary equipment. Further disclosure of the structure of a fuel cell based propulsion system, associated equipment, and their relationship to each other is disclosed in commonly assigned U.S. application Ser. No. 14/804,706 filed Jul. 21, 2015 which is herein incorporated by reference in its entirety.

Any number of different types of fuel cells 15 may be used to make up the fuel cell stack 1 of the propulsion system 20; these fuel cells 15 may be of the metal hydride, alkaline, electrogalvanic, or other variants. The fuel cells 15 within fuel cell stack 1 may be combined in series, parallel, or in a combination of the two in order to produce a higher voltage or current yield, depending on the needs of the vehicle 10.

Figure 2:
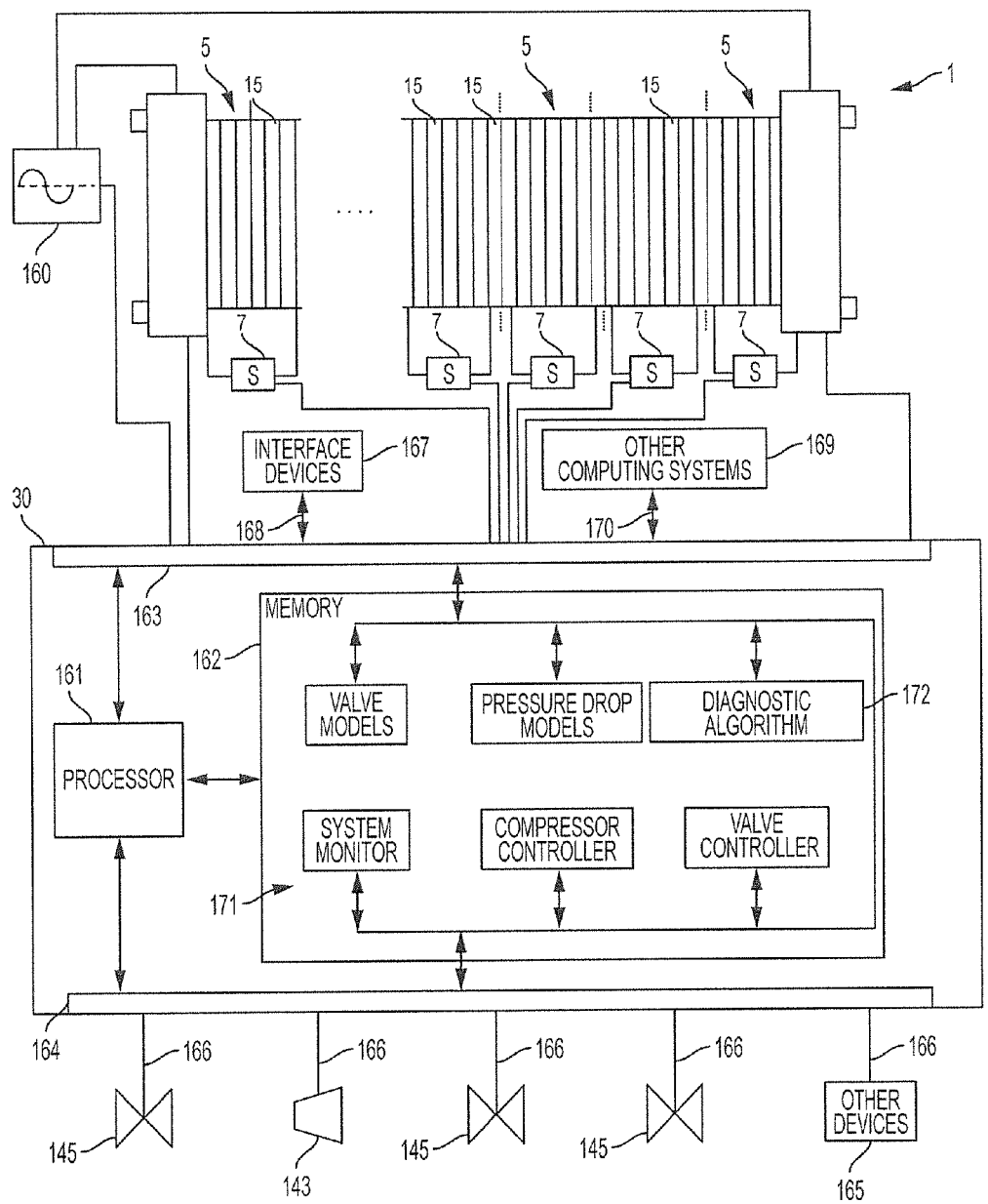
FIG. 2 depicts a controller for a fuel cell stack according to one or more embodiments shown and described herein.

FIG. 2 illustrates a controller 30 for the fuel cell stack 1. The controller 30 is communicatively coupled to various devices and sensors of the fuel cell stack 1. The controller 30 includes one or more processors 161 (e.g., and not by way of limitation, a microprocessor, an application specific integrated circuit (ASIC), field programmable gate array, or the like) communicatively coupled to non-transient memory 162, and one or more interfaces such as, for example, first interface 163 and second interface 164. The memory 162 may be any form of memory capable of storing machine-executable instructions that implement one or more of the functions disclosed herein, when executed by processor 161. For example, and not by way of limitation, memory 162 may be a RAM, ROM, flash memory, hard drive, EEPROM, CD-ROM, DVD, other forms of non-transitory memory devices, or any combination of different memory devices. In one embodiment, the controller 30 may function as a data processing or computer system with its processor 161, input, output, and memory 162, where the latter may be used to temporarily or permanently store codes, programs, models, or related algorithms, collectively labeled code 171, such that the instructions contained in the code 171 are operated upon by the processor 161 based on input data such that output data may be generated by the code. The output data can be conveyed to another program, user, or component (such as a component or sensor of the fuel cell stack 1 for example) via the output. A data bus or related set of wires and associated circuitry forms a suitable data communication path that can interconnect the various components of controller 30, as well as any peripheral equipment in such a way as to permit the system to operate as an integrated whole. Examples include, but are not limited to, a first interface 163, a second interface 164, connections 166, 168, and 170, and the like as explained in greater detail herein below.

The controller 30 communicates with various devices in the fuel cell stack 1 and, in some cases, provides control over such devices. Still referring to FIG. 2, example devices include, but are not limited to, one or more pumps 143, one or more compressors, one or more valves 145, and the one or more sensors. The controller 30 receives, either directly or indirectly, sensor measurements from the fuel cell stack 1 to monitor the operation of the system. For example, the controller 30 may receive temperature, pressure, flow meter, density, valve position, speed, impedance measurements, voltage measurements, current measurements, sensing electrical characteristics of the fuel cell stack 1, or other measurements from sensors or devices 165 associated with the fuel cell stack 1. It should be appreciated that any number of different combinations of sensors and sensor configurations may be used, without deviating from the principles or teachings of the present disclosure.

One or more connections 166 may be any combination of hardwired or wireless connections that provide connections between controller 30 and the one or more pumps 143, one or more valves 145, and other devices 165, respectively. In one embodiment, the one or more connections 166 may be part of a shared data line that conveys measurement data to controller 30 and control commands to the devices of the fuel cell stack 1. In yet other embodiments, the one or more connections 166 may include one or more intermediary circuits (e.g., other microcontrollers, signal filters, etc.) and provide an indirect connection between controller 30 and the one or more pumps 143, one or more valves 145, and other devices 165. If a connection 166 is wireless, the controller 30 and the device (e.g., the one or more pumps 143, one or more valves 145, and other devices 165) include transceivers to transmit and receive data. The wireless connection may use any known protocol such as, for example, IEEE 802 series standards such as WiFi®, ZigBee®, Bluetooth®, and the like.

The second interface 164 may be configured to receive measurement data and to transmit control commands to actuate the one or more pumps 143, one or more valves 145, and other devices 165 of the fuel cell based propulsion system 20. The second interface 164 may also include circuitry configured to digitally sample or filter received measurement data. For example, the second interface 164 may sample temperature data received from a temperature sensor of pump 143 via connection 166 at discrete times (e.g., k, k+1, k+2, etc.) to produce discrete temperature values (e.g., T(k), T(k+1), T(k+2), etc.). For example, the controller 30 may actuate the one or more pumps 143, one or more valves 145, and other devices 165 of the fuel cell based propulsion system 20 to adjust the flow of reactant or air to the fuel cell stack 1.

In some embodiments, the controller 30 may also communicate with interface devices 167 (e.g., but not limited to, a display, a speaker, a printer, or any other electronic device that provides and/or receives data to and from a user) via connection 168. The controller 30 may further communicate with other computing systems 169 (e.g., but not limited to, another controller, a portable electronic device, a server, or the like) via connection 170. Connections 168 and 170 may be wired and/or wireless connections. For example, other computing systems 169 may include a server located remotely from vehicle 10 of FIG. 1 and connection 170 may be a wireless connection. For example, and not by way of limitation, the controller 30 may communicate status condition information to the server in other computing systems 169 via a cellular, WiFi, radio, satellite connection, or the like. The first interface 163 may also include one or more transceivers configured to send and receive location information for vehicle 10. For example, but not limited to, the first interface 163 may include a GPS receiver or cellular receiver that utilizes triangulation to determine the location of vehicle 10. It should be understood that the controller 30 is not limited to only two interfaces and may have more or less as required by the given application. For example in one embodiment, the first interface 163 and the second interface 164 may be a single interface for the controller 30.

Although the controller 30 is shown in FIG. 2 as a singular device, it is to be understood that this is merely exemplary and is not intended to be limiting. For example, processor 161 may include any number of processors of any number of computing devices that execute the instructions stored in memory 162. Likewise, memory 162 may include any number of memory devices and is not limited to memory devices located within the same housing as processor 161. In some cases, processor 161 and/or memory 162 may even be located external to vehicle 100. It should also be understood that the controller 30 may be one of many controllers in the fuel cell based propulsion system 20.

Still referring to FIG. 2, the fuel cell stack 1 comprises one or more cell groups 5. Each cell group 5 comprises a plurality of fuel cells 15 and a group sensor 7. The group sensor 7 is configured to detect electrical characteristics of the respective cell group 5 to which it is coupled. The controller 30 is communicatively coupled to each group sensor 7. As explained in greater detail below, the controller 30 and each group sensor 7 cooperate to detect the occurrence of a non-systemic event or fault (e.g., fuel cell reversal) in each cell group 5. In one embodiment, the group sensor 7 may be used to detect the electrical characteristics (e.g., voltage, current, impedance, frequency, etc.) of respective cell group 5. In one embodiment, each group sensor 7 may comprise a high-resistance resistor coupled across each cell group 5 such that the group sensor 7 and the plurality of fuel cells 15 in the cell group 5 are electrically parallel to each other. In one embodiment, the controller 30 may receive voltage signals from each group sensor 7 and process those voltage signals with a Fast Fourier Transform (FFT) algorithm to detect at least one of: a direct current (DC) group voltage, an alternating current (AC) group voltage, and harmonic group voltage. In one embodiment, the impedance of the cell group 5 may be derived from the detected voltages through the cooperation of the group sensor 7 and the controller 30. It is contemplated that the group sensor 7 may comprise a plurality of individual sensors. For example, in one embodiment, each group sensor 7 may comprise a combination of at least one of an impedance sensor, a DC voltage sensor, an AC voltage sensor, an harmonic sensor, and the like. It should be understood, as known in the art, that the group sensor 7 is electrically coupled to the cell group 5 in a configuration which enables the group sensor 7 to measure and identify the electrical characteristics of the cell group 5 for which the group sensor 7 was configured for.

The AC group voltage and harmonic group voltage may correlate to a stack frequency generated by an AC generator 160. In this embodiment, the AC generator 160 may supply an AC current to the fuel cell stack 1 at the stack frequency.

In one embodiment, the AC generator 160 may supply an AC current to each cell group 5 at a group frequency. In one embodiment, the AC generator 160 may generate a different group frequency for each cell group such that each cell group 5 is identifiable by the frequency which is applied to it. Although not shown in FIG. 2, each AC generator 160 for each cell group 5 may be coupled on parallel with each group sensor 7. This embodiment may aid in differentiating each cell group 5 from another by the controller 30 or to aid in identifying fuel cell reversal in aging cell groups 5 where the fuel cell stack 1 comprises a plurality of cell groups 5, each of a different age. Refer to the discussion of FIG. 10 below for a discussion of the relationship between group frequency and the age of the cell group 5. In all embodiments, the amplitudes and frequencies of the one or more AC currents generated by the AC generator 160 are determined by the controller 30. In other words, the controller 30 is communicatively coupled to the AC generator 160 and may provide operating instructions to the AC generator 160 to generate one or more AC currents at one or more frequencies. It should be understood that this disclosure is not limited to only one AC generator 160 and multiple AC generators may be used. It is contemplated, in one embodiment, that each cell group 5 may comprise an AC generator.

The group frequency and/or the stack frequency may be used by the group sensor 7 to measure a high frequency resistance (HFR) wherein the HFR value is an electrical characteristic of the cell group 5. Each individual group frequency, which may differ for each cell group 5, the same group frequency applied to each cell group 5, and/or stack frequency may be varied to emphasize the HFR value measured by the group sensor 7. It should be understood that the HFR value and impedance of a cell group 5 are the same measurement.

It is contemplated, based on the experimental data presented hereinafter, that a non-systemic fault may result in about a 0.5 $\Omega cm^2$ to about 10 $\Omega cm^2$ or about a 1.8 $\Omega cm^2$ to about 7.2 $\Omega cm^2$ increase in the measured impedance of a cell group 5. An estimate for calculations as discussed herein may be about 2 $\Omega cm^2$, however it should be understood that any impedance may be used within the prescribed range above in the calculation and determination of a non-systemic fault. For example, but not limited to, it is contemplated that this estimate for calculations may need to change as the fuel cells 15 in each cell group 5 ages. Aging is discussed in greater detail in relation to FIG. 10.

Figure 3:
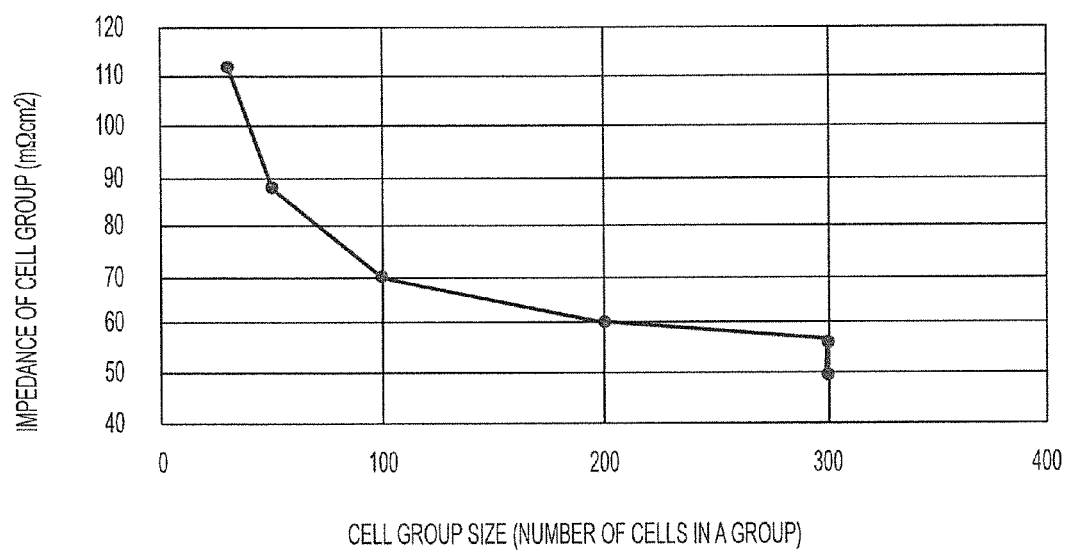
FIG. 3 graphically illustrates the impedance ($\Omega cm^2$) of a cell group per the quantity of fuel cells in the cell group according to one or more embodiments shown and described herein.

FIG. 3 graphically illustrates the impedance ($\Omega cm^2$) of a cell group 5 (FIG. 2) per the quantity of fuel cells 15 (FIG. 2) in the cell group 5. It is contemplated, when an individual fuel cell 15 experiences fuel cell reversal, its impedance will rise to about 2 $\Omega cm^2$. For example, and not by way of limitation, in a cell group 5 of 300 cells, the increase in impedance per fuel cell 15 may be about 0.05 $\Omega cm^2$ (50 m$\Omega cm^2$) to about 0.057 $\Omega cm^2$ (57 m$\Omega cm^2$). If 300 fuel cells 15 represents the total number of fuel cells 15 in a fuel cell stack 1 (FIG. 4), the rise in impedance would be about 0.05 $\Omega cm^2$+(2 $\Omega cm^2$−0.05 $\Omega cm^2$)/300 which equates to about 0.057 $\Omega cm^2$ per fuel cell 15. These results indicate a less than 0.01 $\Omega cm^2$ (10 m$\Omega cm^2$) rise in the overall impedance of the fuel cell stack 1 and may be difficult to differentiate in the presence of stack-related noise factors and other errors or undesired disturbances of useful information in a signal. In other words, using a sensor for the entire fuel cell stack 1 to measure and identify when an individual fuel cell 15 is experiencing a non-systemic event would be difficult to identify when the total increase in impedance of the fuel cell stack 1 is less than about 0.01 $\Omega cm^2$. It is contemplated that the values discussed herein may change dependent on the number of fuel cells 15 in the fuel cell stack 1.

In one embodiment, a cell group 5 may comprise between about thirty to about fifty fuel cells 15 and may indicate a rise in impedance which would be significant enough to differentiate it from stack-related operating noise and other factors. In this embodiment, the impedance may increase per fuel cell 15 of about 0.04 $\Omega cm^2$ (40 m$\Omega cm^2$) for the cell group 5, and is derived from (2 $\Omega cm^2$−0.05 $\Omega cm^2$)/50. This impedance increase from about 0.05 $\Omega cm^2$ (50 m$\Omega cm^2$) to about 0.09 $\Omega cm^2$ (90 m$\Omega cm^2$) is nearly double the value from a normal operating impedance value of 0.05 $\Omega cm^2$. 0.09 $\Omega cm^2$ is derived from 0.05 $\Omega cm^2$+0.04 $\Omega cm^2$. Through analysis, it is determined that a fuel cell stack 1 impedance measured by cell group 5 size of between about thirty to about fifty provides for an impedance value measurement which is identifiable above stack-related noise factors and other errors or undesired disturbances of useful information in a signal. For example, and not by way of limitation, a cell group 5 size of fifty fuel cells 15 would require six fuel cell groups 5 for a fuel cell stack 1 having three-hundred fuel cells 15. This configuration would only add five additional group sensors 7 which is significantly less than a sensor for each individual fuel cell 15 since one sensor for the entire fuel cell stack 1, as indicated herein before, would not be able to identify a non-systemic event.

Figure 4:
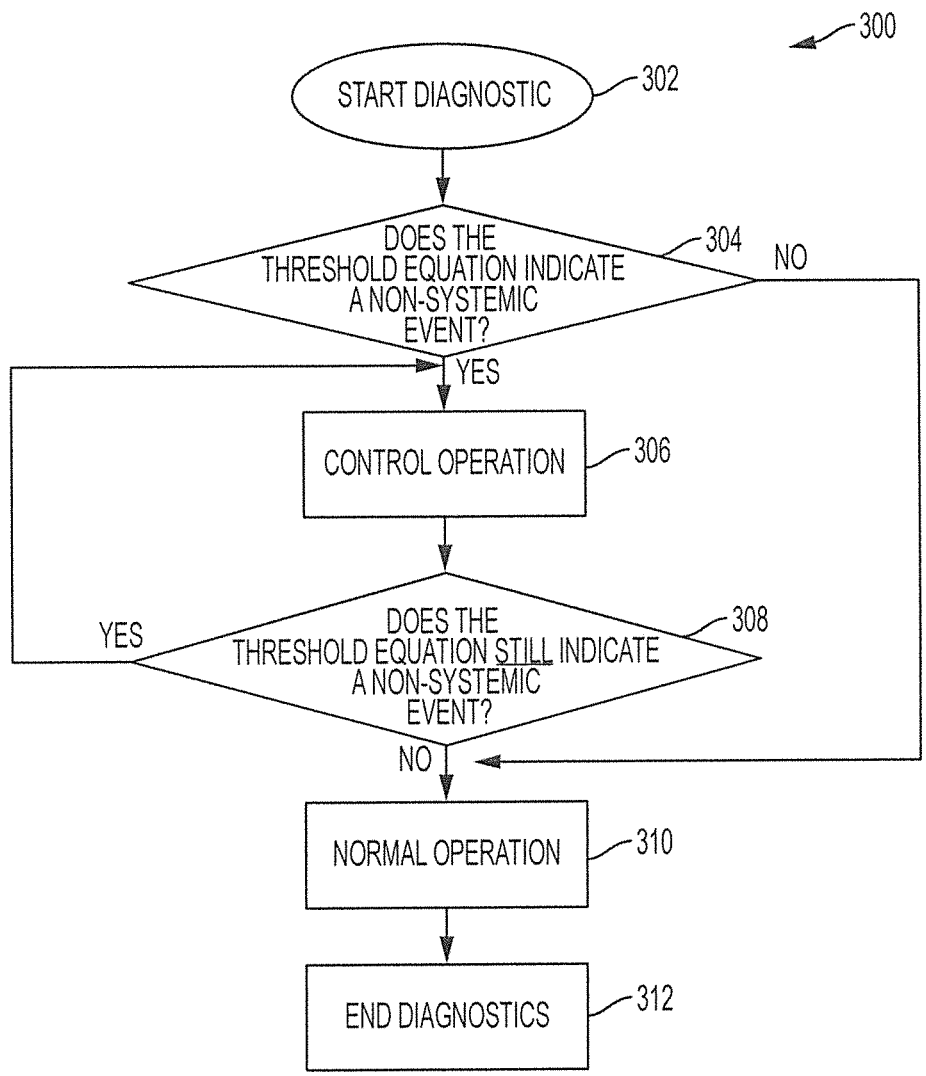
FIG. 4 depicts a diagnostic flowchart according to one or more embodiments shown and described herein.

Referring back to FIG. 2, the controller 30 may indicate the need for diagnostics of the fuel cell stack 1 when the measured electrical characteristic of a cell group 5 indicate a non-systemic fault. In one embodiment, the controller 30 may indicate the need for diagnostics of the fuel cell stack 1 by illuminating a light and/or sounding an alarm on a user interface (not shown) such as, for example, a dashboard of a vehicle. In one embodiment, the controller 30 may indicate the need for diagnostics of the fuel cell stack 1 by changing a bit in memory for later access by a technician or maintenance personnel. In one embodiment, the controller 30 may indicate the need for diagnostics of the fuel cell stack 1 by taking remedial action and executing at least one of the following: reducing the electrical load or the power output of the fuel cell stack 1, shutting down the fuel cell stack 1, allowing the fuel cell stack to operate for a set amount of time before shutdown (e.g., limp home mode), and increasing the flow of reactants or air into the fuel cell stack 1. In one embodiment, the controller 30 may indicate the needs for diagnostic of the fuel cell stack 1 and execute a diagnostic algorithm 172, embodied in machine readable code in memory, as shown in the flowchart 300 in FIG. 4. Referring now to FIGS. 2 and 4, when the code 171 of the controller 30 indicates that a diagnostic check is required, the diagnostic algorithm 172 is started 302. The controller 30 determines the electrical characteristics of each group sensor 7 coupled to the controller 30. The diagnostic algorithm determines if a threshold equation 304 indicates a non-systemic event has occurred or is occurring within each respective cell group 5. If the threshold equation 304 indicates that a non-systemic event has not occurred or is not occurring, the diagnostic algorithm 172 maintains normal operation 310 of the fuel cell stack 1 and ends 312 the diagnostic algorithm 172. If the threshold equation 304 indicates that a non-systemic event has occurred or is occurring, the diagnostic algorithm 172 executes a control operation 306. The diagnostic algorithm 172 will then retest 308 the threshold equation. If the retest 308 of the threshold equation still indicates a non-systemic event is still occurring or if the cell group 5 is indicating a persistent operational effect (i.e., the electrical characteristics of the cell group 5 detected by the group sensor 7 do not change or marginally change after the non-systemic event has been remedied) from a non-system event that had occurred, the diagnostic algorithm 172 will continue to execute the control operation 306. If the retest 308 of the threshold equation indicates that the non-systemic event has stopped or that the persistent operational effects have returned to normal operating conditions, the diagnostic algorithm 172 will return to normal operation 310 of the fuel cell stack 1 and end 312 the diagnostic algorithm 172. It should be understood that multiple iterations of the diagnostic algorithm 172 may be run concurrently in the controller 30, one for each group sensor 7, or one diagnostic algorithm 172 may be run in sequence for each group sensor 7 coupled to the controller 30. It is also contemplated that the electrical characteristic of impedance as detected by the group sensor 7 for each cell group 5 is normalized for the whole cell group 5 as $\Omega cm^2$.

In one embodiment the electrical characteristic under scrutiny is impedance and the threshold equation 304 may be a maximum impedance threshold as shown in Eq. 1

$$\text{cell group impedance} \geq \text{max impedance} \qquad \text{Eq. 1}$$

wherein the cell group impedance is the impedance measured by each group sensor 7. The max impedance may vary depending on the age of the fuel cell stack 1 (FIG. 4), the age of the cell group 5, or the magnitude of the impedance communicated to the controller 30. For example, and not by way of limitation, the threshold equation 304 and retest 308 of the threshold equation may comprise a plurality of incremental thresholds. The control operation 306 may be different depending on the value of the cell group 5 impedance when compared to the plurality of incremental thresholds. Further, the control operation 306 may change over the course of one or more iterations because the max impedance value of the cell group 5 may change such that it exceeds a different set of one or more of the plurality of incremental thresholds of the threshold equation 304 and retest 308 of the threshold. For example, and not by way of limitation, if one group sensor indicates an increase in impedance of the cell group to a large quantity value, e.g. double the normal value of 0.05 $\Omega cm^2$, then the threshold equation 304 or the retest 308 of the threshold equation may indicate a non-systemic event has or is occurring. The diagnostic algorithm 172 may have multiple thresholds for different remedial actions. For example at 0.1 $\Omega cm^2$, a first remedial action of limiting the electrical load on the fuel cell stack while the supply of $H_2$ (i.e., reactant) and air is continued is triggered but at 0.15 $\Omega cm^2$, a second remedial action of shutting down the fuel cell stack (e.g., electrical load is removed from the fuel cell stack and load current becomes zero while the supply of $H_2$ and air is continued) is triggered.

As a more specific example, and not by way of limitation, a set of thresholds may include a first threshold of an impedance measurement for the cell group 5 above 0.09 $\Omega cm^2$, a second threshold between about 0.075 $\Omega cm^2$ and about 0.09 $\Omega cm^2$, a third threshold between about 0.05 $\Omega cm^2$ and about 0.075 $\Omega cm^2$, and a fourth threshold below about 0.05 $\Omega cm^2$. Working our way through FIG. 4 for this example, on a first iteration, the impedance measurement may be about 0.06 $\Omega cm^2$ and the control operation 306 (e.g., first remedial action) may increase the amount of air and/or reactant to the fuel cell stack 1 in an attempt to pressurize and forcibly remove a blockage in an anode channel 181 or a cathode channel 180 (FIG. 5B) of the cell group 5. During the retest 308 of the threshold equation, the impedance measurement may have increased to about 0.08 $\Omega cm^2$ and the control operation 306 (e.g., second remedial action) may then reduce the electrical load on the fuel cell stack 1 to compensate. On a second iteration, the retest 308 of the threshold equation may identify an impedance measurement of about 0.091 $\Omega cm^2$ and the control operation 306 may then shutdown the fuel cell stack 1. Conversely, on a second iteration, the retest 308 of the threshold equation may identify an impedance measurement of about 0.04 $\Omega cm^2$ and the control operation 306 may return the electrical load of the fuel cell stack 1 and the air supply to normal operation 310.

In addition, the electrical characteristic under scrutiny may be current and the diagnostic algorithm 172 may factor in the current density in the cell group 5 to monitor the health of the fuel cell stack 1. As discussed above in relation to the impedance measurement, a set of thresholds may be used for current density to identify a non-systemic event has or is occurring. Current density is the ratio of current to active area of the fuel cell 15. Current density is discussed hereinafter in relation to FIGS. 5A and 5B. For example, and not by way of limitation, a fuel cell stack 1 producing about 400 Amps with an active area of 300 $cm^2$ will have a current density of about 1.33 $A/cm^2$. If a concentration (i.e., current density) of current in a section of a fuel cell 15 is greater than 1.33 $A/cm^2$, the diagnostic algorithm 172 may identify a non-systemic event and initiate an appropriate remedial response based on measurements (e.g., impedance and/or current density) compared to the set of thresholds. It should be understood that the thresholds for the impedance measurement and/or current density may be determined based on the configuration of the fuel cell propulsion system 20 (FIG. 1) and more particularly, the fuel cell stack 1 configured to power the fuel cell propulsion system 20. In one embodiment, the thresholds may be determined based on the composition of the MEA and the amount of surface area of the MEA.

When the diagnostic algorithm 172 identifies a non-systemic event such as anode starvation of reactant for example, the control operation 306 would trigger a remedial action. Such remedial actions may include, if power from a battery (e.g., electrical storage devices 27 (FIG. 1)) is available, proactively bleed at higher pressure bias by high speed rotation of a hydrogen pump using power from the battery or intermittent increase in generated power by the fuel cell stack, which in turn would increase the injector flow of $H_2$ to remedy any flooding condition. In place of or together with the high speed rotation of a hydrogen pump, a regulator or an injector can be opened for increasing the injection amount or pressure of $H_2$. Further, together with the increase in the injection amount or pressure of $H_2$, the electrical load on the fuel cell stack may be decreased. It is contemplated that the increase of the flow rate of $H_2$ may be made based on control of increasing pressure of a pump 143 (FIG. 2) and/or injector (e.g., other devices 165 (FIG. 2)) while considering the state of charge of the battery.

At higher current density (and higher coolant temperature) the diagnostic algorithm 172 will have a set of high current density thresholds for power limitation and shutdown of the fuel cell stack 1. For example, and not by way of limitation, "shutdown of the fuel cell stack" in Table 1 below may include the detection of excessive dryout of the MEA of a fuel cell 15 by the diagnostic algorithm 172 and the control operation 306 may shutdown the fuel cell stack 1 in response. In another non-limiting example, "shutdown of the fuel cell stack" in Table 1 below may include the control operation 306 running a diagnostic for leak detection during shutdown of the fuel cell stack 1. If a large leak is detected, the control operation 306 may execute a modified shutdown strategy as shown and described in application Ser. No. 14/742,785, which is herein incorporated by reference in its entirety. In another example, "shutdown of the fuel cell stack" in Table 1 below may include disabling the ability of the fuel cell stack 1 to be restarted once the fuel cell stack 1 is shutdown by the control operation 306. For all embodiments, Table 1 below is an example of how the diagnostic algorithm 172 may handle non-systemic events.

TABLE 1

Control operation actions.

LOW CURRENT DENSITY

| | |
|---|---|
| Threshold 2 ≥ threshold equation and retest threshold eq. ≥ Threshold 1 | 1) Increase H2 flow rate, and/or 2) Decrease electrical load on the fuel cell stack |
| Threshold 3 ≥ threshold equation and retest threshold eq. ≥ Threshold 2 | Shutdown the fuel cell stack |

HIGH CURRENT DENSITY

| | |
|---|---|
| Threshold 2 ≥ threshold equation and retest threshold eq. ≥ Threshold 1 | Shutdown the fuel cell stack |

Hereinbelow, several embodiments of the threshold equation 304 and the retest 308 of the threshold equation are described. It should be understood that although impedance and voltage are specifically mentioned, any electrical characteristic described herein may be used in the threshold equation 304 and the retest 308 of the threshold equation. In other words, the threshold equation 304 and the retest 308 of the threshold equation are not limited to only impedance and voltage.

In one embodiment, the threshold equation 304 and the retest 308 of the threshold equation may be $$\frac{d \text{ (cell group impedance)}}{dt} \geq \text{max impedance rate} \quad \text{Eq. 2}$$

In this embodiment, if the diagnostic algorithm detects a sudden jump in impedance in a cell group, the control operation 306 is implemented. The threshold equation 304 and the retest 308 of the threshold equation may be implemented as an increase in a derivative of the cell group impedance more than a threshold (e.g., 0.01 Ωcm²/second) or just difference in the cell group impedance value more than a threshold within a certain time (e.g. one second). Table 1 is an example of the control operation 306 for this embodiment.

In one embodiment, the threshold equation 304 and the retest 308 of the threshold equation may be $$\text{cell group impedance} \leq \gamma^* \text{cell group impedance of another cell group in the fuel cell stack} \quad \text{Eq. 3}$$

In this embodiment, the threshold equation 304 and the retest 308 of the threshold equation include a separation factor γ, which may be, for example, 1.5 or 2. The separation factor γ is a threshold and is used to identify the situation where the impedance of one cell group is greater than the impedance of other cell groups in the fuel cell stack and may indicate a cell group experiencing a non-systemic event. For example, and not by way of limitation, if the impedance of one cell group is greater than other impedances of other cell groups within the fuel cell stack (Eq. 3) and a sudden jump in impedance in the cell group that is greater than other cell groups is detected (Eq. 2) and optionally, the separation persists (i.e., persistent operational effects), then the control operation 306 is triggered. It should be noted that the separation factor (Eq. 3) equation above may be written as:

$$\frac{\text{cell group impedance}}{\text{cell group impedance for other cell groups}} \geq \gamma \quad \text{Eq. 4}$$

Table 1 is an example of the control operation 306 for this embodiment.

In one embodiment, the threshold equation 304 and the retest 308 of the threshold equation may be Eq. 4 with voltage as the electrical characteristic under scrutiny instead of impedance. The separation factor γ for voltage may be about 0.9 volts (or about 10% separation). Table 1 is an example of the control operation 306 for this embodiment.

In one embodiment, the threshold equation 304 and the retest 308 of the threshold equation may be Eq. 2 with voltage as the electrical characteristic under scrutiny instead of impedance. Table 1 is an example of the control operation 306 for this embodiment.

In one embodiment, the threshold equation 304 and the retest 308 of the threshold equation may be:

$$\text{cell group impedance ratio} \geq \gamma \quad \text{Eq. 5}$$

In this embodiment, the diagnostic algorithm determines if a non-systemic event is occurring in a cell group by evaluating the measured cell group impedances versus the cell group impedance under normal operation. The impedance ratio is the measured impedance derived from a group sensor divided by the cell impedance under normal operation. Table 1 is an example of the control operation 306 for this embodiment.

In one embodiment, the threshold equation 304 and the retest 308 of the threshold equation may Eq. 4 with the impedance ratio of each cell group under scrutiny instead of impedance of each cell group. Table 1 is an example of the control operation 306 for this embodiment.

In one embodiment, the threshold equation 304 and the retest 308 of the threshold equation may be:

$$\frac{\frac{d \text{ (cell group impedance)}}{dt}}{\frac{d \text{ (cell group impedance under normal operation)}}{dt}} \geq \gamma \quad \text{Eq. 6}$$

where the rate of change of each cell group is compared against the rate of change of impedance in a normal cell group to determine if a non-systemic event is occurring within each cell group. Table 1 is an example of the control operation 306 for this embodiment. It is contemplated that the rate of change in a normal cell group could be either a set threshold or a comparison of the rate of change in the electrical characteristics of each cell group 5 in the fuel cells stack 1 against each other and the identification of any outlying measurements which would indicate at least one cell group 5 is experiencing a non-systemic event.

In one embodiment, the threshold equation 304 and the retest 308 of the threshold equation may be:

$$\frac{d \text{ (cell group impedance)}}{dt} \geq \xi \quad \text{Eq. 7}$$

where the rate of change in a cell group is compared against the rate of change of impedance in a normal cell group to determine if a non-systemic event is occurring within that cell group. Table 1 is an example of the control operation 306 for this embodiment.

Figure 5A:
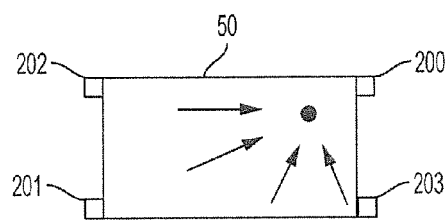
FIG. 5A depicts a top view of a membrane electrode assembly according to one or more embodiments shown and described herein.
Figure 5B:
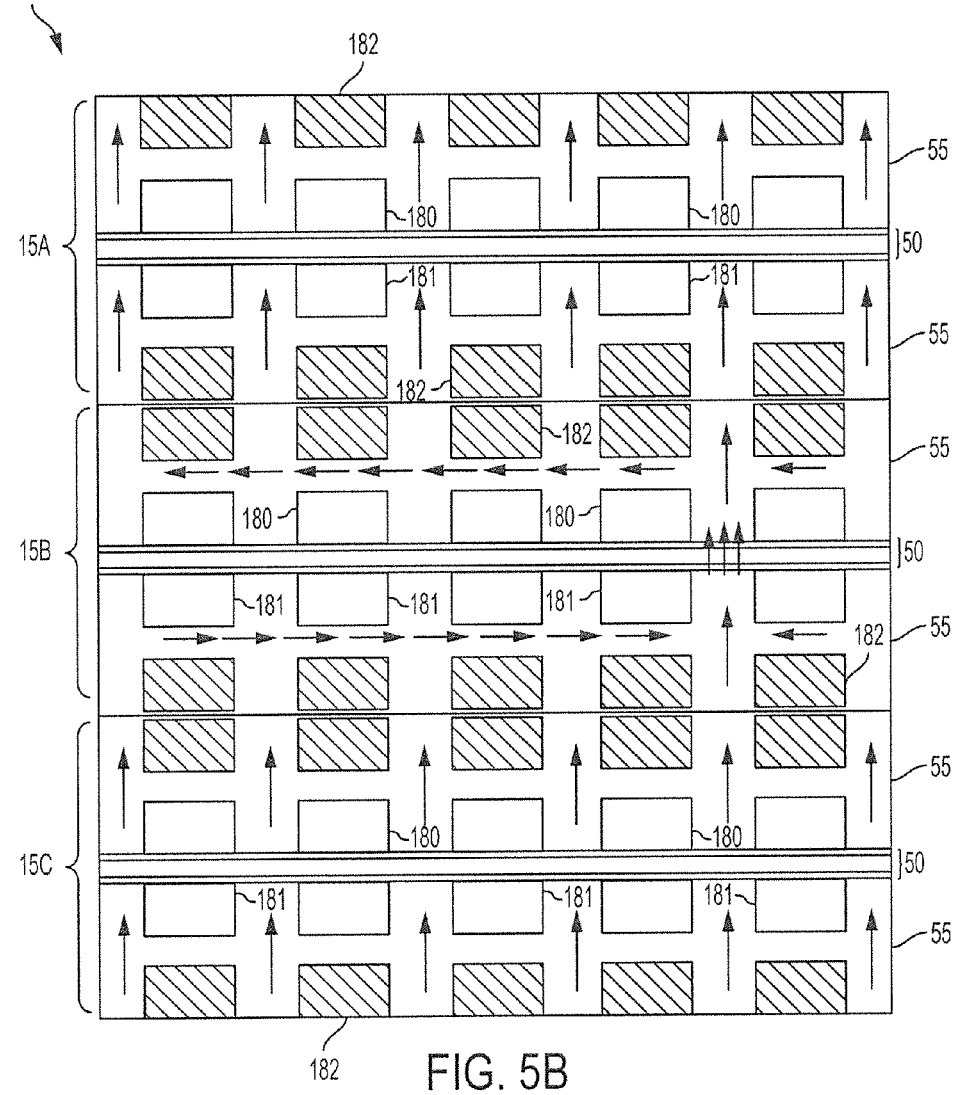
FIG. 5B depicts a sectional side view of a cell group according to one or more embodiments shown and described herein.

Referring to FIGS. 5A and 5B, a cause of fuel cell reversal includes reactant starvation which reverses the voltage ($V_{cell}$) of the fuel cell 15 (i.e., reactant-starvation-based reversal mode) or reversal due impedance losses i.e., IR-loss-based reversal mode). It is contemplated that air starvation within the fuel cell stack 1 does not cause fuel cell reversal. Such reversals due to air starvation are much lower than about −1 volt per fuel cell 15 and typically in the range of about −0.1 volt per fuel cell 15.

The reactant-starvation-based reversal mode typically leads to fuel cell reversal less than about −1 volts if the electrode of the fuel cell 15 can support oxygen evolution reaction (OER) in presence of water or carbon corrosion reaction (COR). Though COR causes electrode degradation, it may not cause hard shorts. However, once the carbon in electrode of the fuel cell 15 is consumed, it cannot support either of these reactions then the voltage of the fuel cell 15 may drop below about −1 volt and cause hard short. A hard short is defined as a concentrated quantity of current in one or both of the fuel cell 15 electrodes. A hard short may result in permanent damage to the fuel cell 15 such as a hole in the bipolar plate (e.g., first bipolar plate 55A and/or second bipolar plate 55B in FIG. 5B). A soft short does not cause permanent damage but does result in parasitic power loss in generation of power by the affected fuel cell 15. Remedial actions discussed hereinabove may be tailored to remediate soft shorts.

Fuel cell reversal may also occur due to IR losses within the fuel cell 15. "$V_{cell}=V_e-IR=V_e-\Sigma j \times R$" where $V_e$ is the voltage of the electrode (i.e., either the first bipolar plate 55A or the second bipolar plate 55B in FIG. 5B), I is the resultant current, j is the fractional current, and R is the sum of electronic resistance of the electrode, the DM, and the Protonic resistance of the MEA 50.

FIG. 5A is a top view of the MEA 50 and FIG. 5B is a side view of a section of a cell group 5 comprising a plurality of fuel cells 15 and highlighting a location in the center fuel cell 15B where a quantity of current is concentrated. Referring first to FIG. 5A, the MEA 50 of a fuel cell 15 is shown with an anode inlet 200, an anode outlet 201, a cathode inlet 202, and a cathode outlet 203. A common root cause of fuel cell reversal is current density maldistribution. Current flow is represented in FIGS. 5A and 5B as arrows and current density maldistribution is represented as a series or concentration of arrows in close proximity to each other. Current density maldistribution may occur due to either aforementioned reactant starvation or excessive membrane dryout. In the case of reactant starvation, the current density moves to and concentrates (represented by the dot) in the vicinity of anode inlet 200 as shown in FIG. 5A. In the case of excessive membrane dryout, current density moves to and concentrates in wettest region of the MEA 50 in the vicinity of cathode outlet 203.

Referring to FIG. 5B, for either case of current maldistribution, the distribution of current in a fuel cell 15 experiencing fuel cell reversal (e.g., center fuel cell 15B) results in in-plane current in the bipolar plate 55 (e.g., the first bipolar plate 55A and/or the second bipolar plate 55B), and DM in turn causes large voltage (IR) drop due to impedance losses in the fuel cell 15 (e.g., center fuel cell 15B). The in-plane current in the bipolar plates 55A, and 55B is shown in the center fuel cell 15B as series of arrows indicating the direction of current flow within the bipolar plates 55A and 55B. The current density maldistribution discussed in reference to FIG. 5A is shown in the center fuel cell 15B as close proximity parallel arrows through the MEA 50 from the second bipolar plate 55B to the first bipolar plate 55A. The outer fuel cells 15 (e.g., upper fuel cell 15A and lower fuel cell 15C) illustrate a normal operating fuel cell 15 with a uniform current density.

As illustrated in vertically-adjacent fuel cells 15 (e.g., upper fuel cell 15A, center fuel cell 15B, and lower fuel cell 15C) in FIG. 5B, the in-plane path can be in tens of centimeters compared to normal operation where current moves through plane and path is less than 0.5 millimeters (or in the order of 100×). This large and long in-plane path increase results in large resistance which can be measured via impedance, high frequency resistance, or voltage drop corresponding to IR loss, by a group sensor 7 detect fuel cell reversal in the fuel cell 15.

Experimental Results

Figure 6:
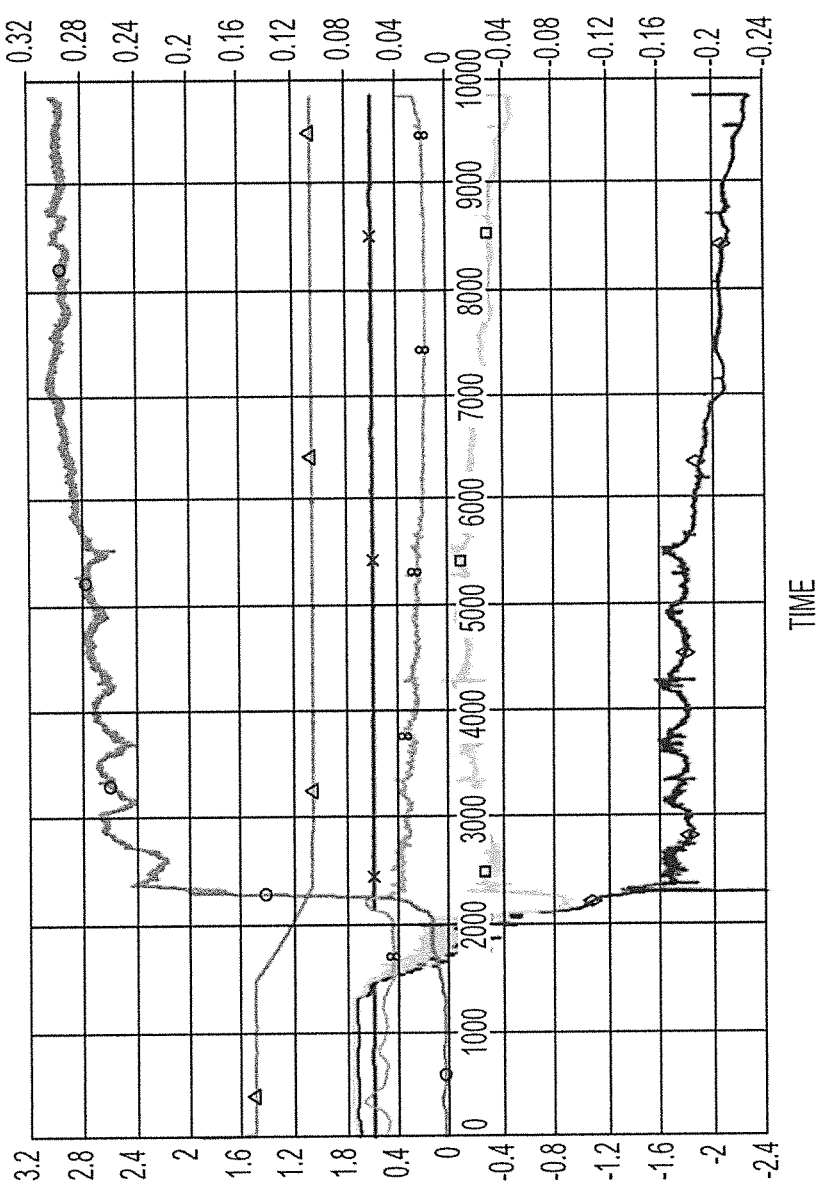
FIG. 6 graphically illustrates fuel cell reversal due to reactant-starvation-based reversal mode according to one or more embodiments shown and described herein.

FIG. 6 graphically illustrates fuel cell reversal due to a non-systemic fault such as reactant-starvation-based reversal mode (i.e., anode starvation of a fuel cell in a five cell fuel cell stack). The longitudinal axis illustrates time in seconds, whereas the vertical axis on the left illustrates current density [A/m²], anode stoich (ratio), voltage [V], and impedance, i.e., resistance [Ωcm²]. A fuel cell stack comprising five, serially connected fuel cells were used to collect the data graphically depicted in FIG. 6. A sensor (e.g., group sensor 7 of FIG. 2) was coupled to the fuel cell stack to detect voltage, impedance, and IR of the fuel cell stack as a whole. In other words, the sensor detects the electrical characteristics of the cell group and not each individual fuel cell.

A non-systemic fault was introduced in the five cell stack by blocking some of anode channels 181 (FIG. 5B) for a center fuel cell (i.e., No. 3) such that it ran lower anode stoich (triangle plot) than the rest of the fuel cells in the fuel cell stack. The fuel cell stack was operated at a consistent power output of constant current density (X plot) of about 0.6 A/cm². At about 2200 seconds the anode stoich (triangle plot) was reduced close to 1. While the non-starved fuel cell (Nos. 1, 2, 4, and 5) did not reverse (not shown in FIG. 6) the starved fuel cell (i.e., No. 3) reversed from about +0.8 volts to about −1.6 volts (diamond plot). Concomitantly, the impedance (circle plot) of fuel cell No. 3 cell increased to about 3 Ωcm² and the IR corrected voltage (i.e. electrode voltage $V_e$) (square plot) is about −0.4 volts. It is noted that normal impedance values of a fuel cell not experiencing reversal are in the order of about 0.05 Ωcm². Comparing the impedance value (circle plot) of FIG. 6 to the normal impedance values, the impedance of fuel cell No. 3 increased by a factor of 60. It is noted that the detected increase in impedance, due to reactant-starvation-based reversal mode of a single fuel cell in a group of fuel cells, was detected by the sensor connected to the whole five cell fuel cell stack.

Referring back to FIG. 2, the increase impedance in one fuel cell 15 is identifiable in a change in impedance for the whole cell group 5. For example, for cell group 5 comprising fifty fuel cells 15, in normal operation the impedance of the cell group 5 may be about 0.05 Ωcm²×50=2.5 Ωcm². The same cell group 5 with a fault, as for example one fuel cell experiences fuel cell reversal, the impedance of the cell group 5 may be about 0.05 Ωcm²×49+(3 Ωcm²×1)=5.45 Ωcm². The factor of "3 Ωcm²" in (3 Ωcm²×1) part of the equation indicates that the fuel cell experiencing fuel cell reversal has an impedance value of about 3 Ωcm² as discussed before in relation to FIG. 6. This calculation illustrates that when a cell group 5 of fifty serially-connected fuel cells has a fuel cell experiencing fuel cell reversal, the impedance detected by the group sensor 7 may approximately double from about 2.5 $\Omega cm^2$ to about 5.45 $\Omega cm^2$. In other words, the impedance value in terms of normalized per fuel cell 15 would increase from about 0.05 (2.5/50) $\Omega cm^2$ to about 0.109 (5.45/50) $\Omega cm^2$.

Figure 7:
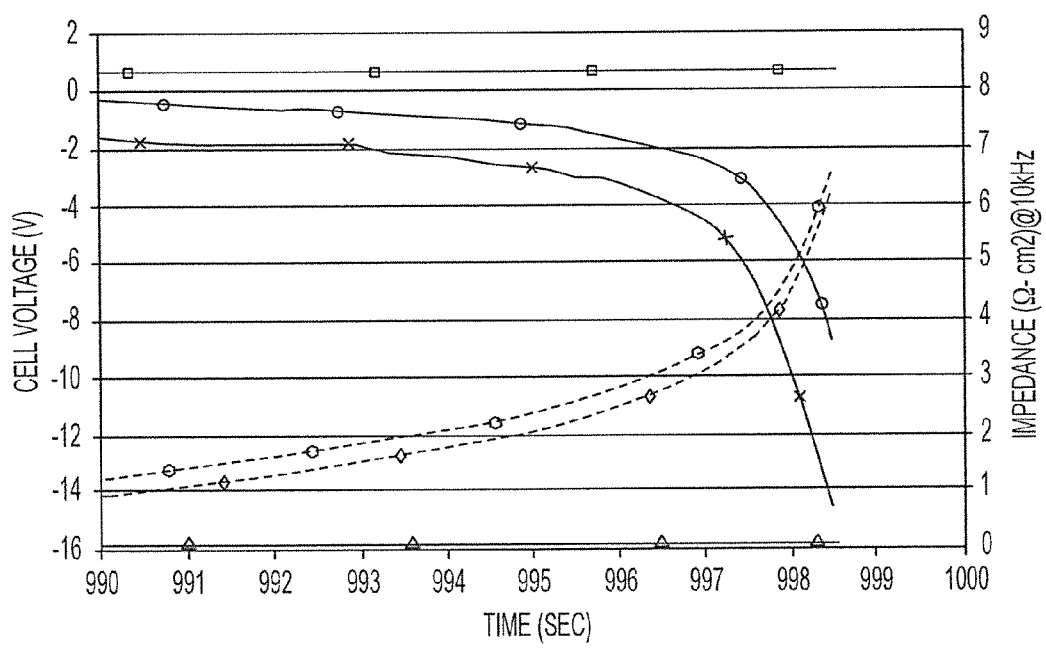
FIG. 7 graphically illustrates another set of data regarding fuel cell reversal due to reactant-starvation-based reversal mode according to one or more embodiments shown and described herein.

FIG. 7 graphically illustrates another data set due to reactant-starvation-based reversal mode, i.e., anode starvation of a fuel cell in a three cell fuel cell stack, operating at about 0.6 $A/cm^2$. A fuel cell stack comprising three fuel cells (Nos. 1, 2 and 3) was operated with some gas fields (i.e., one or more of the anode channels 181 (FIG. 5B)) of fuel cell No. 2 blocked. Both cell voltage and impedance were measured at various locations on fuel cell No. 2. Moreover the impedance data was collected at different group frequencies spanning from about 100 Hz to about 10 kHz. FIG. 7 illustrates the following: the fuel cell stack voltage (circle trace), the fuel cell stack impedance (hexagon plot), the fuel cell voltage for fuel cells Nos. 1 and 3 (square plot); impedance for fuel cells Nos. 1 and 3 (triangle plot); the impedance for fuel cell No. 2 (diamond plot); a fuel cell voltage for fuel cell No. 2 (X plot). A first electrical characteristic sensor (e.g., group sensor 7 (FIG. 2)) was coupled to fuel cell No. 1, a second electrical characteristic sensor was coupled to fuel cell No. 2, a third electrical characteristic sensor was coupled to fuel cell No. 3, and a stack sensor was coupled to the fuel cell stack. As illustrated, as the anode stoich of the fuel cell stack was reduced, fuel cells Nos. 1 and 3 did not experience anode starvation and thus, did not reverse. However, fuel cell No. 2 experienced anode starvation and showed fuel cell reversal. At the same time, the impedance of stack (hexagon plot) and cell No. 2 (diamond plot) increased from about 1 $\Omega cm^2$ to about 6.5 $\Omega cm^2$ or close to about 120 times the normal value. At about 998 seconds and onward, the current density became zero (0 $A/cm^2$) due to the release of the electrical load while supplying $H_2$ and air continuously to the fuel cell stack.

Figure 8:
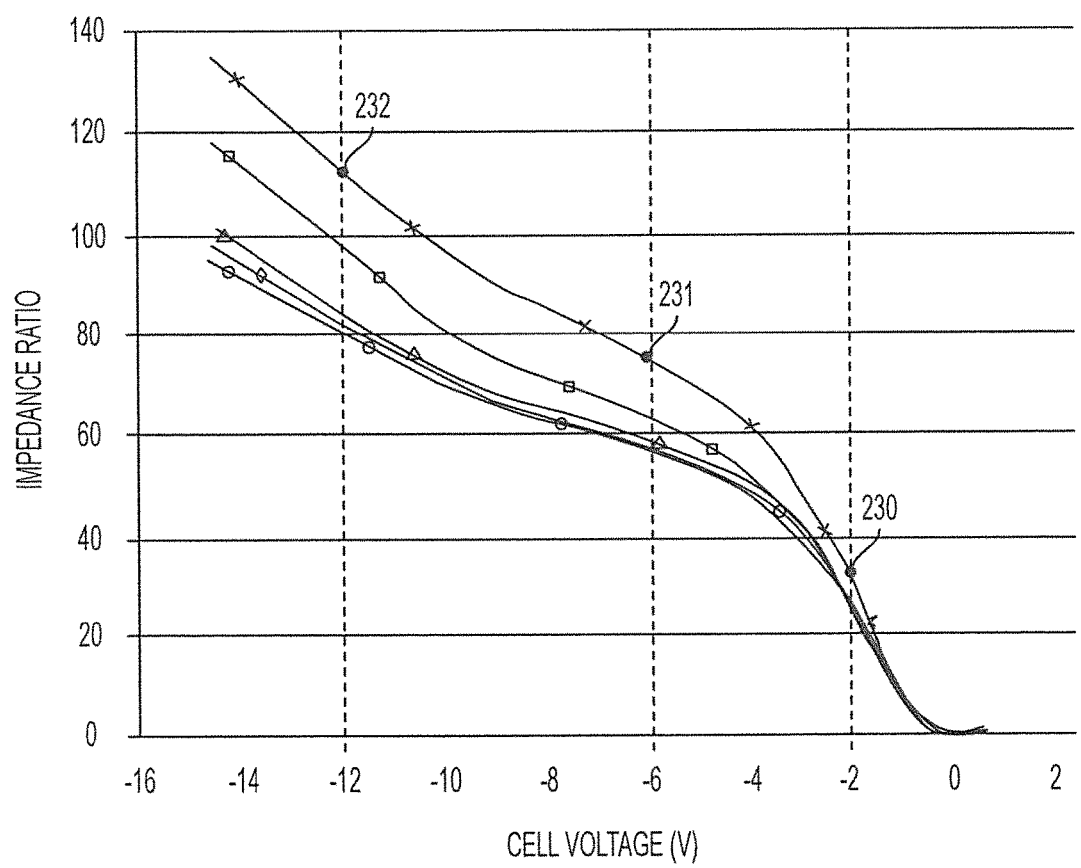
FIG. 8 graphically illustrates the impedance ratio of a fuel cell experiencing fuel cell reversal at different group frequencies according to one or more embodiments shown and described herein.

FIG. 8 is a graphical illustration of the impedance ratio of a fuel cell experiencing fuel cell reversal at different group frequencies: 100 Hz (circle plot), 200 Hz (triangle plot), 300 Hz (diamond plot), 500 Hz (square plot), and 10 kHz (X plot). As the voltage of a fuel cell experiencing fuel cell reversal increases in negative magnitude (i.e., negative voltage increases below zero), the impedance ration also increases. At representative points in FIG. 8, the three vertical axes represent the impedance ratio of about 32% 230, 75% 231, and 113% 232 across all five plots.

At about −2 volts, the impedance ratio is similar regardless of the frequency but as the reversal of the fuel cell increases, a larger reversal of cell voltage results in a larger impedance ratio. It is contemplated that the impedance of the MEA 50 at normal operating condition may be lower at higher frequencies because the sensor does not pick up electrode effects. FIG. 8 illustrates that, regardless of the group frequency applied to an individual fuel cell of a cell group, the impedance ratio increases as the magnitude of the cell voltage of the fuel cell experiencing fuel cell reversal increases. It is contemplated that the group frequency may be tailored to provide the greatest increase in the impedance ratio as the fuel cell experiences fuel cell reversal. For example, it is contemplated that the larger group frequency the greater the impedance ratio. Of course, the group frequency must account for background noise, signal loss, etc.

Figure 9:
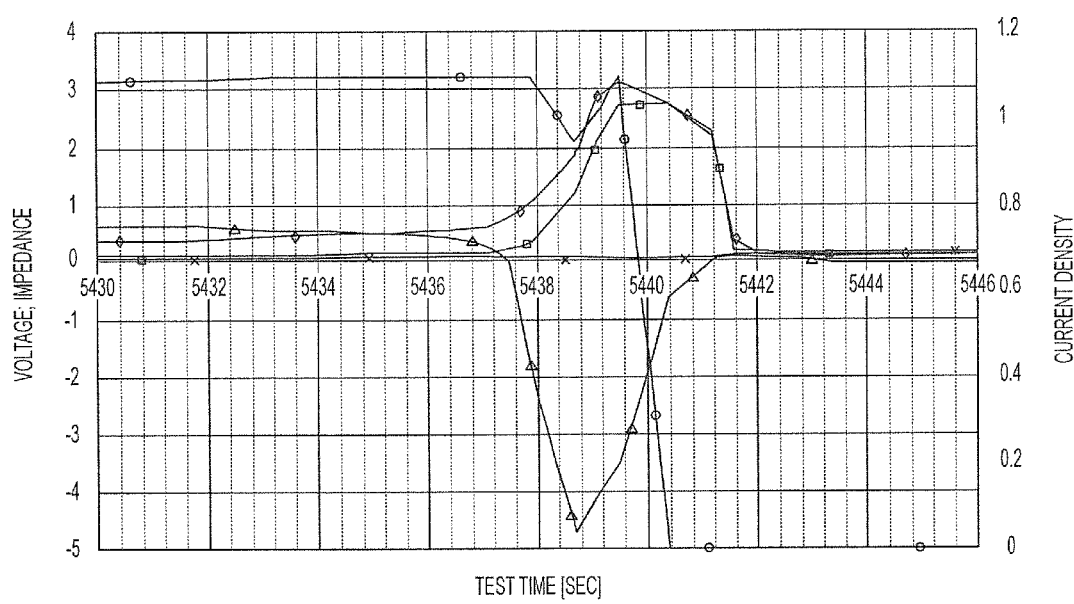
FIG. 9 graphically illustrates impedance and voltage of a fuel cell stack experiencing MEA dryout due to a non-systemic event according to one or more embodiments shown and described herein.

FIG. 9 graphically illustrates impedance and voltage of a fuel cell stack with five fuel cells while experiencing MEA dryout due to a non-systemic event such as IR-loss based reversal mode. A non-systemic fault was introduced in a five cell stack by blocking some of coolant channels 182 (FIG. 5B) for a center fuel cell (i.e., No. 3) such that it ran at maximum power output with the coolant temperature at its maximum allowable operating value of current density (circle plot) having 1.1 $A/cm^2$ with coolant at 95° C. With some, but not all, of the coolant channels 182 of fuel cell No. 3 blocked, the fuel cell No. 3 ran at 10° C. higher temperature when compared to fuel cells Nos. 1, 2, 4, and 5, near 105° C. The inlet relative humidity of fuel cell No. 3 was reduced to about 25% such that, when comparing the outlet relative humidity of all five fuel cells, fuel cell Nos. 1, 2, 4, and 5 had about 70% relative humidity at the cathode outlet while fuel cell No. 3 was at about 50% relative humidity at its cathode outlet. Under these operating conditions, fuel cell No. 3 experienced fuel cell reversal after about 5438 seconds after start-up of the fuel cell stack. Fuel cell No. 3 reversed to about −5 volts (triangle plot) and the associated impedance of fuel cell No. 3 increases from about 0.05 $\Omega cm^2$ to about 2.8 $\Omega cm^2$ (square plot). The impedance of the fuel cell stack also increased from about 0.4 $\Omega cm^2$ to about 3 $\Omega cm^2$ (diamond plot). The impedance of the remaining cells, fuel cell Nos. 1, 2, 4, and 5 (X plot) remained about 0.1 $\Omega cm^2$ throughout the fuel cell reversal. This is about 30×(3 $\Omega cm^2$/ 0.1 $\Omega cm^2$) amplification of the impedance of fuel cell No. 3 versus the impedance of the remaining fuel cells.

Figure 10:
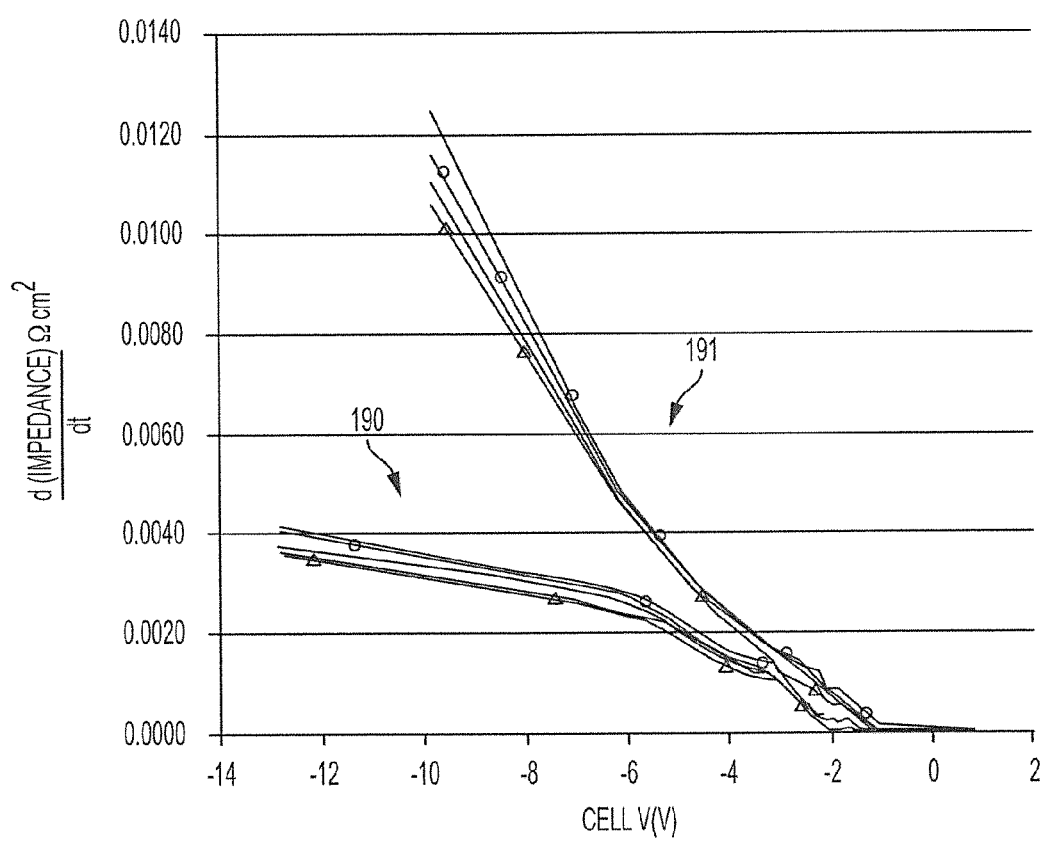
FIG. 10 graphically illustrates the rate of change in impedance during a non-systemic event according to one or more embodiments shown and described herein.

Referring now to FIG. 10, the rate of change in impedance during a non-systemic event is shown. FIG. 10 uses the data for fuel cell No. 2 from FIG. 7 at different group frequencies: 100 Hz (circle plot) and 10 kHz (triangle plot). It is contemplated that another detection approach of non-systemic faults could employ monitoring rate of change of impedance $$\left( \frac{d \text{ (impedance)}}{dt} \right)$$

to discriminate impedance increase due to non-systemic faults. For example, it is contemplated that two non-systemic events may be identified and differentiated by using Eq. 8 below. The dynamics of the impedance rise rate due to current mal-distribution (i.e., the first term in the left side) can be differentiated from the impedance rise rate due to membrane hydration (i.e., the second term in the left side).

$$\left( \frac{d \text{ ( impedance measured by the group sensor)}}{dt} - \frac{d \text{ (impedance measured by the water balance monitor module)}}{dt} \right) = \alpha \quad \text{Eq. 8}$$

Using Eq. 8, when the difference a exceeds a threshold value, it is an indication of current maldistribution in a fuel cell and may be used to trigger remedial action. Remedial action could be similar to control action of power limitation or shutdown as explained greater herein.

FIG. 10 also illustrates changes due to aging of the fuel cell. The change in impedance for a fuel cell experiencing a non-systemic event varies depending on the amount of degradation of the electrode of the fuel cell. A group sensor for a cell group of new fuel cells (i.e., "beginning of life")

is shown by the new plots 190 before the fuel cells were degraded. Beginning of life may mean at the time when the fuel cell stack is either at start-up or completely new. An aged set of plots 191 are shown to highlight the difference the age of a fuel cell and a fuel cell stack plays in measured impedance values when compared to the new plots 190. It is contemplated that a diagnostic algorithm used to detect non-systemic faults may take into account the age and/or start-up of the fuel cells and/or the fuel cell stack when monitoring for and identifying non-systemic events. It is contemplated that the controller 30 may use a table or chart to adjust the one or more thresholds, stored in memory and used to identify non-systemic events, as the fuel cell stack 1 ages.

The ability to identify a non-systemic event or fault within a fuel cell stack with minimal amount of sensors and associated equipment enables a controller to eliminate or at least reduce the amount of damage a fuel cell sustains and may increase the ability of the fuel cell stack to continue to operate to get the vehicle to place of repair. Because of the minute changes in the electrical characteristics if a fuel cell experiencing a non-systemic event, individual fuel cell monitoring is required. As described herein, an alternative to individual fuel cell monitoring is to group the fuel cells. Grouping the fuel cells reduces the complexity of the monitoring and reduces the quantity of components needed to monitor the health of the fuel cell stack.

It is noted that the term "sensor," as used herein, means a device that measures a physical quantity and converts it into a signal which is correlated to the measured value of the physical quantity. Furthermore, the term "signal" means an electrical, magnetic or optical waveform, such as current, voltage, flux, DC, AC, sinusoidal-wave, triangular-wave, square-wave, and the like, capable of being transmitted from one location to another. It should be understood by those skilled in the art that the polarity indicated for electrical characteristics is for reference only and may be reversed depending on the sensor connections. It is contemplated that the polarity presented herein is indicative of the preferred sensor connections.

Unless otherwise defined, all technical and scientific terms used herein have the same meaning as commonly understood by one of ordinary skill in the art to which the claimed subject matter belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Certain terminology is used in the disclosure for convenience only and is not limiting. The words "left", "right", "front", "back", "upper", and "lower" designate directions in the drawings to which reference is made. The terminology includes the words noted above as well as derivatives thereof and words of similar import.

Here and in the following, the term "impedance" is generally used in the sense of electrical impedance which may comprise ohmic, as well as capacitive and/or inductive components. Accordingly, the term "impedance value" generally refers to a complex value or a vector of values reflecting either or all of the impedance components. In some embodiments, the impedance is an ohmic resistance and the corresponding impedance value is a resistor value. However, capacitive and/or inductive impedance components may be evaluated alternatively or additionally to an ohmic impedance component. The term "impedance value" may further be referred to as a value correlated with and derivable from an impedance or impedance component, such as a specific conductivity, capacity, or the like as well as to an electrical measuring value correlated with an impedance or impedance component, such as the voltage drop over an impedance.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

We claim:

1. A fuel cell stack comprising:
    a first cell group including:
        a first set of fuel cells; and
        a first group sensor coupled to the first set, wherein the first group sensor is configured to measure a first impedance of the first cell group and a derivative of the first impedance;
    a second cell group including:
        a second set of fuel cells; and
        a second group sensor coupled to the second set, wherein the second group sensor is configured to measure a second impedance of the second cell group and a derivative of the second impedance; and
    a controller communicatively coupled to the first group sensor and the second group sensor and including:
        memory; and
        one or more processors that execute machine readable instructions which:
            compare at least one of:
                the first impedance and the second impedance;
                the first impedance and one or more thresholds stored in the memory; and
                the second impedance and the one or more thresholds stored in the memory to thereby generate a first comparison;
            compare at least one of:
                the derivative of the first impedance and the derivative of the second impedance;
                the derivative of the first impedance and the one or more thresholds stored in the memory; and
                the derivative of the second impedance and the one of more thresholds stored in the memory to thereby generate a second comparison; and
            identify a need for fuel cell stack diagnostics when at least one of the first comparison and the second comparison indicates a non-systemic event.

2. The fuel cell stack of claim 1, wherein the one or more thresholds is an impedance threshold, and further wherein the one or more processors execute machine readable instructions which indicate the non-systemic event when the first impedance is equal to or greater than the impedance threshold.

3. The fuel cell stack of claim 2, wherein the one or more processors execute machine readable instructions which modify the impedance threshold as the first cell group ages.

4. The fuel cell stack of claim 1, wherein the one or more thresholds is a rate of impedance change threshold, and further wherein the one or more processors execute machine readable instructions which indicate the non-systemic event when the first derivative is equal to or greater than the rate of impedance change threshold.

5. The fuel cell stack of claim 1, wherein the one or more processors execute machine readable instructions which
identify whether the first impedance is greater than a separation factor from the second impedance.

6. The fuel cell stack of claim 1, further including an alternating current generator configured for supplying an alternating current to the first cell group at a first frequency and to the second cell group at a second frequency; wherein the one or more processors execute machine readable instructions which measure the first impedance at the first frequency and the second impedance at the second frequency.

7. The fuel cell stack of claim 6, wherein the first frequency is from 100 Hz to 10 kHz.

8. The fuel cell stack of claim 6, wherein the first frequency is adjusted to increase a magnitude of the first impedance such that a lower frequency results in a larger magnitude of the first impedance and a higher frequency results in a lesser magnitude of the first impedance.

9. The fuel cell stack of claim 1, wherein the first group sensor is configured to measure a first voltage of the first cell group; wherein the one or more thresholds is a voltage threshold; and further wherein the one or more processors execute machine readable instructions which compare the first voltage to the voltage threshold and indicate the non-systemic event when the first voltage is equal to or lesser than the voltage threshold.

10. The fuel cell stack of claim 9, wherein the one or more processors execute machine readable instructions which modify the voltage threshold as the first cell group ages.

11. The fuel cell stack of claim 9, wherein the one or more thresholds is a rate of voltage change threshold; and further wherein the one or more processors execute machine readable instructions which:
measure a derivative of the first voltage: and
indicate the non-systemic event when the derivative of the first voltage is equal to or greater than the rate of voltage change threshold.

12. The fuel cell stack of claim 1, wherein the one or more thresholds includes a first threshold and a second threshold; and further wherein the one or more processors execute machine readable instructions which:
execute a first remedial action if the first comparison between the first impedance and the first threshold indicates the non-systemic event; and
execute a second remedial action if the first comparison between the first impedance, the first threshold, and the second threshold indicates the non-systemic event.

13. The fuel cell stack of claim 12, wherein the first remedial action is to increase a flow of a reactant through the fuel cell stack and the second remedial action is to shutdown the fuel cell stack.

14. The fuel cell stack of claim 12, wherein the first remedial action is to decrease an electrical load on the fuel cell stack and the second remedial action is to shutdown the fuel cell stack.

15. The fuel cell stack of claim 12, wherein the one or more processors execute machine readable instructions which:
perform the first remedial action;
resume normal operation of the fuel cell stack if the first comparison with the first threshold no longer indicates the non-systemic event;
perform the second remedial action; and
resume normal operation of the fuel cell stack if the first comparison with the first threshold and the second threshold no longer indicate the non-systemic event.

16. The fuel cell stack of claim 1, wherein the first set of fuel cells and the second set of fuel cells each includes from 30 fuel cells to 50 fuel cells; and further wherein the one or more processors do not execute machine readable instructions which generate any of the first comparison and the second comparison for individual fuel cells of the first set and the second set.

17. A fuel cell propulsion system comprising:
a fuel cell stack including:
a first cell group including:
a first set of fuel cells; and
a first group sensor coupled to the first set, wherein the first group sensor is configured to measure a first impedance of the first cell group and a derivative of the first impedance;
a second cell group including:
a second set of fuel cells; and
a second group sensor coupled to the second set, wherein the second group sensor is configured to measure one or both of a second impedance of the second cell group and a derivative of the second impedance; and
a controller communicatively coupled to the first group sensor and the second group sensor and including:
memory; and
one or more processors that execute machine readable instructions which:
compare at least one of:
the first impedance and the second impedance;
the first impedance and one or more thresholds stored in the memory; and
the second impedance and the one or more thresholds stored in the memory to thereby generate a first comparison;
compare at least one of:
the derivative of the first impedance and the derivative of the second impedance;
the derivative of the first impedance and the one or more thresholds stored in the memory; and
the derivative of the second impedance and the one of more thresholds stored in the memory to thereby generate a second comparison; and
identify a need for fuel cell stack diagnostics when at least one of the first comparison and the second comparison indicates a non-systemic event; and
one or more fuel storage vessels each configured for storing a reactant or air and fluidly coupled by one or more valves to the fuel cell stack.

18. The fuel cell propulsion system of claim 17, wherein the one or more thresholds is an impedance threshold; and further wherein the one or more processors execute machine readable instructions which compare the first impedance to the impedance threshold and indicate the non-systemic event when the first impedance is equal to or greater than the impedance threshold.

19. The fuel cell propulsion system of claim 17, wherein the one or more processors execute machine readable instructions which
  identify whether the first impedance is greater than a separation factor from the second impedance.

20. The fuel cell propulsion system of claim 17, wherein the one or more thresholds is a voltage threshold; and further wherein the one or more processors execute machine readable instructions which compare a first voltage of the first cell group to the voltage threshold and indicate the non-systemic event when the first voltage is equal to or lesser than the voltage threshold.

\* \* \* \* \*